United States Patent
Li

(10) Patent No.: US 10,444,565 B2
(45) Date of Patent: Oct. 15, 2019

(54) DISPLAY APPARATUS, BACKLIGHT DEVICE, AND LIGHT SOURCE MODULE

(71) Applicant: BOE TECHNOLOGY GROUP CO., LTD., Beijing (CN)

(72) Inventor: Wenbo Li, Beijing (CN)

(73) Assignee: BOE TECHNOLOGY GROUP CO., LTD., Beijing (CN)

(*) Notice: Subject to any disclaimer, the term of this patent is extended or adjusted under 35 U.S.C. 154(b) by 300 days.

(21) Appl. No.: 15/107,058

(22) PCT Filed: Feb. 3, 2016

(86) PCT No.: PCT/CN2016/073240
§ 371 (c)(1),
(2) Date: Jun. 21, 2016

(87) PCT Pub. No.: WO2017/054386
PCT Pub. Date: Apr. 6, 2017

(65) Prior Publication Data
US 2017/0261811 A1  Sep. 14, 2017

(30) Foreign Application Priority Data
Sep. 30, 2015 (CN) .......................... 2015 1 0640214

(51) Int. Cl.
*G02F 1/1335* (2006.01)
*G02F 1/167* (2019.01)
(Continued)

(52) U.S. Cl.
CPC ..... *G02F 1/133602* (2013.01); *G02B 6/0043* (2013.01); *G02B 6/0068* (2013.01); *G02F 1/133615* (2013.01); *G02F 1/167* (2013.01); *G06F 21/84* (2013.01); *G09G 3/3406* (2013.01); *H01L 27/3223* (2013.01);
(Continued)

(58) Field of Classification Search
None
See application file for complete search history.

(56) References Cited

U.S. PATENT DOCUMENTS

2002/0171813 A1  11/2002  Kimura et al.
2010/0008501 A1   1/2010  Iwasaki
(Continued)

FOREIGN PATENT DOCUMENTS

CN  101356810 A   1/2009
CN  101604112 A  12/2009
(Continued)

OTHER PUBLICATIONS

First Office Action regarding Chinese application No. 201510640214. X, dated Aug. 11, 2016. Translation provided by Dragon Intellectual Property Law Firm.
(Continued)

*Primary Examiner* — Richard H Kim
(74) *Attorney, Agent, or Firm* — Harness, Dickey & Pierce, P.L.C.

(57) ABSTRACT

The present disclosure discloses a display apparatus, a backlight source, and a light source module. The display apparatus includes a display panel and interference light sources which generate interference light on a display side of the display panel. The interference light is invisible light.

10 Claims, 4 Drawing Sheets

(51) Int. Cl.
*F21V 8/00* (2006.01)
*G06F 21/84* (2013.01)
*G09G 3/34* (2006.01)
*H01L 27/32* (2006.01)

(52) U.S. Cl.
CPC ...... *H01L 27/3225* (2013.01); *H01L 27/3244* (2013.01); *G02F 2001/133624* (2013.01); *G02F 2203/11* (2013.01); *G09G 2358/00* (2013.01)

(56) References Cited

U.S. PATENT DOCUMENTS

2010/0246212 A1* 9/2010 Yang ................... G02B 6/0055
362/607
2011/0148816 A1 6/2011 Jhu et al.

FOREIGN PATENT DOCUMENTS

| | | |
|---|---|---|
| CN | 101846290 A | 9/2010 |
| CN | 104635381 A | 5/2015 |
| CN | 105137654 A | 12/2015 |
| CN | 204945577 U | 1/2016 |
| TW | M277953 U | 10/2005 |
| WO | WO-2007-043577 A1 | 4/2007 |
| WO | WO-2012-070273 A1 | 5/2012 |

OTHER PUBLICATIONS

Written Opinion of the International Searching Authority for international application No. PCT/CN2016/073240.
European Search Report regarding application No. EP16728577.4 dated Apr. 10, 2019.

* cited by examiner

DISPLAY APPARATUS, BACKLIGHT DEVICE, AND LIGHT SOURCE MODULE

CROSS-REFERENCE TO RELATED APPLICATION APPLICATIONS

This application is the U.S. national phase of PCT Application No. PCT/CN2016/073240 filed on Feb. 3, 2016, which claims a priority of the Chinese Patent Application No. 201510640214.x filed on Sep. 30, 2015, the disclosures of which are incorporated in their entirety by reference herein.

TECHNICAL FIELD

The present disclosure relates to the field of display technology, in particular to a display apparatus, a backlight device, and a light source module.

BACKGROUND

Liquid crystal display technology innovation is inseparable from the field to meet various kinds of requirements from users and insatiable and subversive creation of developers for the products. Defective product itself will lead researchers to continuous product improvement. For example, (1) based on the problems existing in viewing angles of the liquid crystal, wide viewing angle modes, such as Advanced Super Dimension Switch (ADS), In-Plane Switching (IPS), Multi-domain Vertical Alignment (MVA), are developed and widely applied in practical use; (2) with the use of a narrow viewing angle of liquid crystal and other assistant means, the normally wide display area is limited to a specific narrow front view area. This may help to protect privacy of the user and achieve the function of anti-peeping.

However, when some information needs to be displayed only and surreptitious photographing of the displayed content needs to be forbidden, there is no effective solution provided in the related art. That is, how to display information on the display device so as to enable the user to view the information properly and to prevent the displayed content from being photographed by a stranger is a technical problem to be solved.

SUMMARY

It is an object of the present disclosure to provide a technical solution in which information can be displayed on a display device so as to enable a user to view the information properly and prevent the displayed content from being photographed by a stranger by generating interference on a display screen or on an object using an interference light source which illuminates light invisible to the user but detectable by a photographing device.

In order to achieve the above-described object, the present disclosure provides a display apparatus. The display apparatus includes a display panel and interference light sources. The interference light sources generate interference light on a display side of the display panel. The interference light is invisible light.

Alternatively, the display panel is liquid crystal display panel.

Alternatively, the display apparatus further includes a light guide plate and backlight sources. The back light sources provide, for the liquid crystal display panel, visible light necessary for a display operation. Both the interference light sources and the backlight sources are disposed on one side of a light incident surface of the light guide plate, the invisible light from the interference light source passes through the light guide plate and reaches the liquid crystal display panel, and the invisible light sources generate the interference light on the display side of the liquid crystal display panel.

Alternatively, each backlight source is an edge-type backlight source. The display apparatus further includes a first light bar for disposing the edge-type backlight sources. The interference light sources and the edge-type backlight sources are disposed on the first light bar spaced from one another and along a direction of a long side of a plane of the first light bar, the plane being opposed to the light guide plate.

Alternatively, each backlight source is an edge-type backlight source. The display apparatus further includes a first light bar for disposing the edge-type backlight sources. The interference light sources and the edge-type backlight sources are disposed on the first light bar in a stacked manner and along a direction of a short side of a plane of the first light bar, the plane being opposed to the light guide plate.

Alternatively, each backlight source is an edge-type backlight source. The display apparatus further includes a first light bar for disposing the edge-type backlight sources and a second light bar disposed along a side surface of the light guide plate. The second light bar is opposed to the first light bar or is adjacent to the first light bar. The interference light sources are disposed on the second light bar, and the second light bar has a straight-line shape or an L-shape.

Alternatively, each backlight source is a direct-type backlight source and the interference light sources and the direct-type backlight sources are disposed alternately and spaced from one another.

Alternatively, the display panel is an organic light-emitting diode (OLED) panel or an electrophoresis display panel.

Alternatively, the interference light sources are disposed around the OLED panel or the electrophoresis display panel.

Alternatively, each interference light source is inclined toward a center of the OLED panel or toward a center of the electrophoresis display panel at a predetermined angle so that the interference light from the interference light source covers an entire display area of the OLED panel or the electrophoresis display panel.

Alternatively, each interference light source is an infrared luminescent apparatus.

The present disclosure further provides a backlight device which provides backlight for a liquid crystal display panel. The backlight device includes an interference light sources for generating interference light on a display side of the liquid crystal display panel. Herein, the interference light is invisible light.

The present disclosure further provides a light source module. The light source module includes interference light sources disposed around a target to be interfered. The target to be interfered is a display device. The interference light sources are capable of generating interference light on a surface of the target to be interfered and the interference light is invisible light.

Alternatively, the light source module further includes a frame surrounding the target to be interfered. The interference sources are disposed on the frame.

Compared to the related art, according to the display apparatus, the backlight source, and the light source module of the present disclosure, a light source which can illuminates light invisible to person but detectable by a photographing device is employed as an interference light source. Since the user cannot view the light from the interference light source, the user may not be interrupted by the interference light when viewing the display screen. However, the photographing device can detect the interference light from the interference light source. Thus, when a person takes photos of the display screen which is normally displaying using the photographing device, the interference light may adversely affect the photographing result. With this configuration, the user may feel safe from any surreptitious photographing of the display screen by a stranger, and user privacy and display screen safety can be highly protected.

DETAILED DESCRIPTION

The following will describe a technical solution according to embodiments of the present disclosure in detail with reference to accompanying drawings. The embodiments to be described below are a part of, rather than all of, the embodiments of the present disclosure. A person skilled in the art can achieve other embodiments without any creative work based on the embodiments of the present disclosure, and these achieved embodiments are also included in a protection scope of the present disclosure.

Unless otherwise defined, any technical or scientific terms used herein shall have the common meaning understood by a person of ordinary skills. Such words as "first" and "second" used in the specification and claims are merely used to differentiate different components rather than to represent any order, number or importance. Similarly, such words as "one" or "one of" are merely used to represent the existence of at least one member, rather than to limit the number thereof. Such words as "connect" or "connected to" may include electrical connection, direct or indirect, rather than being limited to physical or mechanical connection. Such words as "on/above", "under/below", "left" and "right" are merely used to represent relative position relationship, and when an absolute position of an object is changed, the relative position relationship will be changed too.

Figure 1:
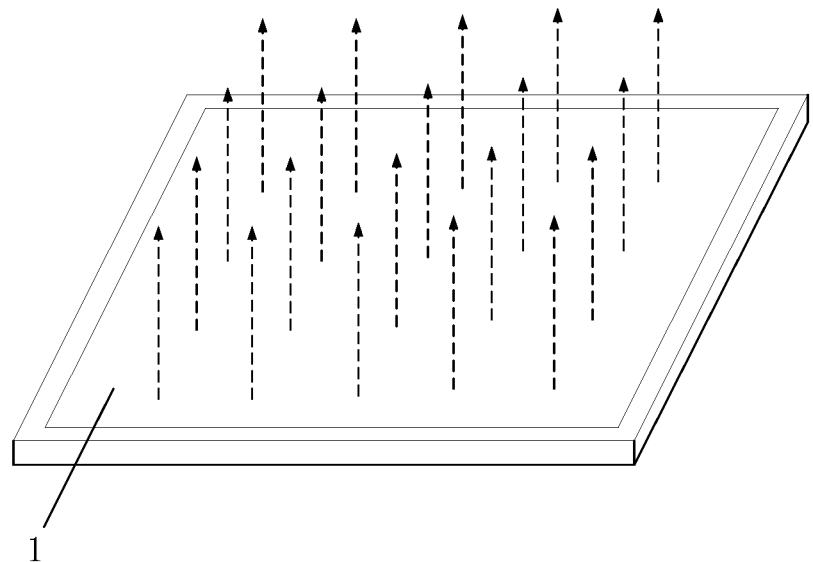
FIG. 1 is a diagram showing a configuration of a display apparatus according to an embodiment of the present disclosure.

In order to achieve the main object of the present disclosure, an embodiment of the present disclosure provides a display apparatus. FIG. 1 shows a configuration of the display apparatus according to the embodiment of the present disclosure. As shown in FIG. 1, the display apparatus includes a display panel 1 and interference light sources (FIG. 1 shows only in schematic manner that the interference light sources generate interference light) which generate interference light (shown by dashed arrows) on a display side of the display panel 1. The interference light is invisible light. FIG. 1 does not show a configuration and a disposition of the interference light sources. This is because the interference light sources may be designed to have different configurations and different dispositions so as to fit different type display panels 1. In such a manner, the interference light sources can effectively interfere the photographing of displayed content of the display panels 1.

As long as that the interference light source generates the interference light and the interference light can effectively interfere, on the display side of the display panel, the displayed screen of the display panel, the interference light sources can be disposed in any manner. In this way, a surreptitious photographing of the display screen by a stranger can be prevented and user privacy can be properly protected.

In an embodiment of the present disclosure, the display panel may include a liquid crystal display panel, an organic light-emitting diode (OLED) panel, or an electrophoresis display panel. In practical use, these types of display panels are all usually used in display devices. The liquid crystal display panel is a passive light illuminating display panel. That is, the liquid crystal display panel illuminates no light itself and performs the display operation only when the backlight source is provided. Since OLED is an active light illuminating element, the OLED panel is an active light illuminating display panel. When performing the display operation, there is no necessary to provide an additional backlight source. The electrophoresis display panel is also known as electronic paper. The electronic paper is a reflective element, and light source of the electronic paper is provided by environment light.

In practical use, the display panel may include other types of display panels for performing the display operations, and is not limited to the above-described three types.

The following will describe configurations of the display apparatus having above-described three type display panels when respective interference light sources are disposed with respect to the display apparatus.

(1) When the display panel is the liquid crystal display panel, the display apparatus according to one embodiment of the present disclosure further includes a light guide plate and backlight sources. The backlight sources provide visible light for the liquid crystal display panel so that the liquid crystal display panel can perform the display operation. Both the interference light sources and the backlight sources are disposed on one side of a light incident surface of the light guide plate. For an edge-type backlight source, the light incident surface is a side surface of the light guide plate. For a direct-type backlight source, the light incident surface is a surface opposite to a light exiting surface of the light guide plate. Usually, in the direct-type backlight source, the light incident surface is a lower side surface of the light guide plate. The invisible light from the interference light sources passes through the light guide plate, reaches the liquid crystal display panel, and generates the interference light on the display side of the liquid crystal display panel.

Figure 2:
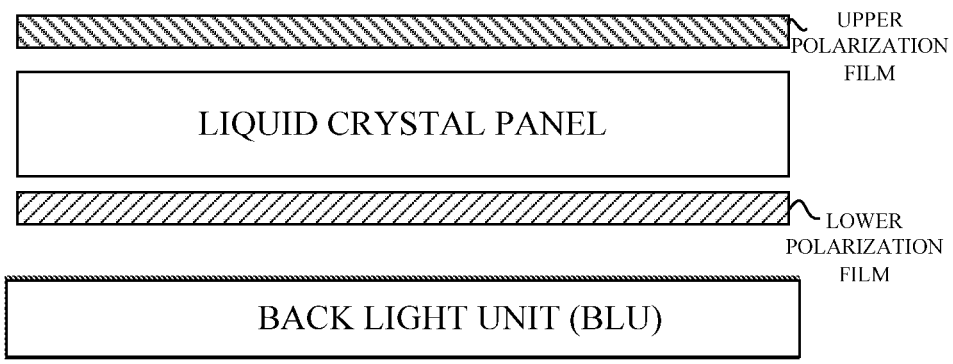
FIG. 2 is a diagram showing a relative positional relation of components included in a liquid crystal display panel according to an embodiment of the present disclosure.

That is, the interference light sources may be disposed at a position where a backlight unit (BLU) which includes the backlight sources is provided, i.e., they may be disposed together with the backlight sources. For easy understanding, referring to FIG. 2 which shows a relative positional relationship of the components included in the liquid crystal display panel of the display apparatus, the following will describe a configuration when the interference light sources and the backlight sources are disposed together in the BLU.

Based on the above arrangement of the interference light sources, in an embodiment of the present disclosure, the display apparatus can employ the following four manners to arrange the interference light sources.

First Manner: each backlight source is an edge-type backlight source, the display apparatus may further include a first light bar for disposing the edge-type backlight sources. The interference light sources and the edge-type backlight sources are disposed on the first light bar, spaced from one another and along a direction of a long side of a plane of the first light bar, the plane being opposed to the light guide plate.

The first manner may be also called as a single-sided edge-type arrangement manner. For the edge-type backlight sources and the interference light sources, their quantities and interval manners have no limit. For example, the edge-type backlight sources and the interference light sources may be disposed alternately. For another example, for every two edge-type backlight sources, one interference light source may be disposed. For yet another example, for every three or more edge-type backlight sources, one interference light source may be disposed.

Figure 3:
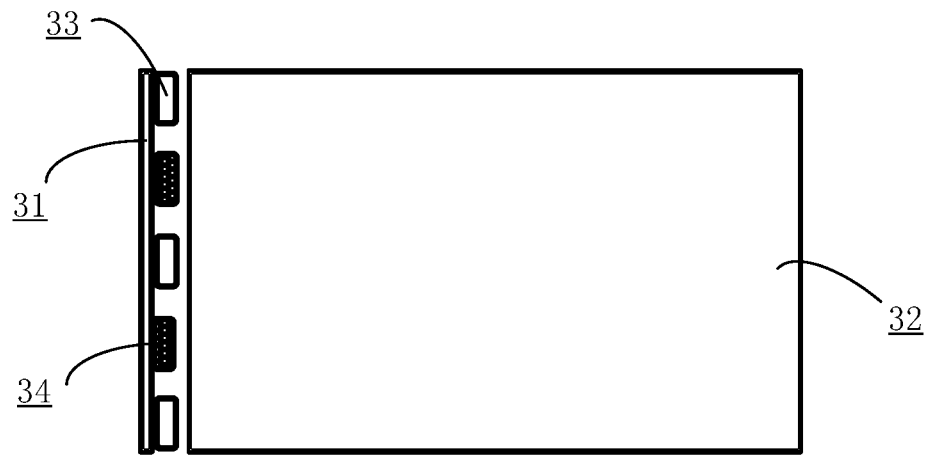
FIG. 3 is a diagram showing an arrangement of interference light sources and edge-type backlight sources in a liquid crystal display panel using a first manner according to an embodiment of the present disclosure.

For easy understanding, referring to FIG. 3 which shows an arrangement manner of the interference light sources and the edge-type backlight sources in the liquid crystal display panel according to an embodiment of the present disclosure, the first light bar 31 is disposed on a left side of the light guide plate 32 (as the light incident surface of the light guide plate 32), edge-type backlight sources 33 (for example, LED may be employed as the edge-type backlight source for illuminating visible light) and the interference light sources 34 may be disposed spaced from each other on the first light bar 31. The edge-type backlight sources 33 illuminate visible light and the interference light sources 34 illuminate interference light (invisible for human eyes), and the visible light and the interference light enters the light guide plate 32 simultaneously, from the left side surface of the light guide plate 32, then is reflected and scattered by the bottom surface of the light guide plate 32 (functioning as a grid point surface of the light guide plate 32), and exits from the top surface of the light guide plate 32 (functioning as the light exiting surface of the light guide plate 32).

Second Manner: each backlight source is an edge-type backlight source, the display apparatus may further include a first light bar for disposing the edge-type backlight sources. The interference light sources and the edge-type backlight sources are disposed on the first light bar in a stacked manner and along a direction of a short side of a plane of the first light bar, the plane being opposed to the light guide plate. For the edge-type backlight sources and the interference light sources, their quantities and interval manners have no limit. For example, the edge-type backlight sources and the interference light source may be disposed alternately. For another example, for every two edge-type backlight sources, one interference light source may be disposed. For yet another example, for every three or more edge-type backlight sources, one interference light source may be disposed.

The second manner may be also called as a single-sided edge-type arrangement manner. Compared with the first manner, the second manner is different in the positions of the interference light sources and the edge-type backlight sources on the light bar.

Figure 4A:
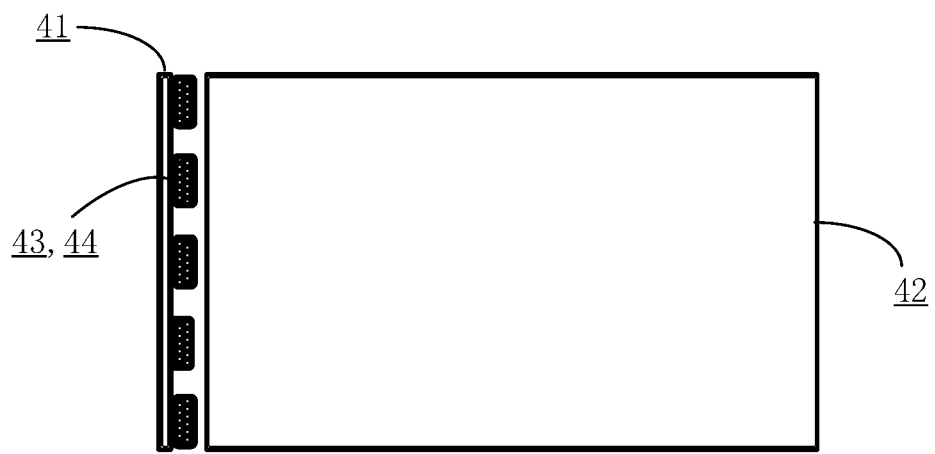
FIG. 4A is a plan view of an arrangement of interference light sources and edge-type backlight sources in a liquid crystal display panel using a second manner according to an embodiment of the present disclosure.
Figure 4B:
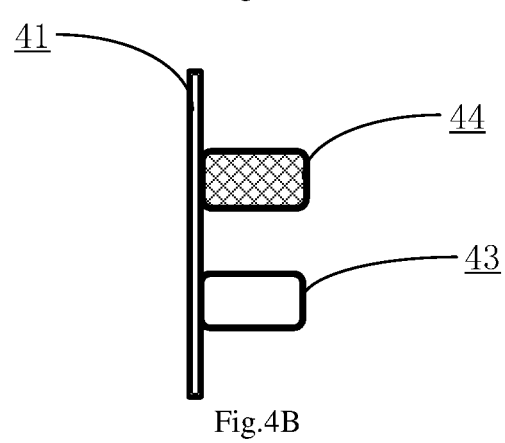
FIG. 4B is a front view of an arrangement of the interference light source and the edge-type backlight source in the liquid crystal display panel using the second manner according to an embodiment of the present disclosure.
Figure 4C:
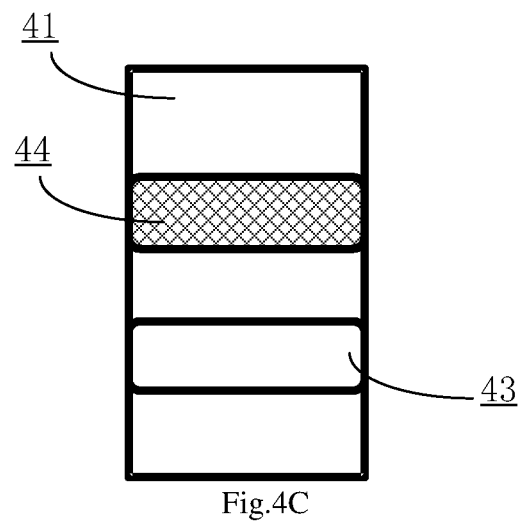
FIG. 4C is a right side view of an arrangement of the interference light source and the edge-type backlight source in the liquid crystal display panel using the second manner according to an embodiment of the present disclosure.

For easy understanding, FIG. 4A to 4C may be referred to. FIG. 4A is a plan view of an arrangement of interference light sources and edge-type backlight sources in a liquid crystal display panel using the second manner according to an embodiment of the present disclosure. FIG. 4B is a front view of an arrangement of the interference light sources and the edge-type backlight sources in the liquid crystal display panel using the second manner according to an embodiment of the present disclosure. FIG. 4C is a right side view of an arrangement of the interference light sources and the edge-type backlight sources in the liquid crystal display panel using the second manner according to an embodiment of the present disclosure.

As shown in FIG. 4A, the first light bar 41 is disposed on a left side surface (functioning as a light incident surface of the light guide plate 42) of the light guide plate 42. The edge-type backlight sources 43 (for example, LED can be employed as the edge-type backlight source for illuminating visible light) may be disposed together with the interference light source 44 on the first light bar 41. FIG. 4A only shows the edge-type backlight source 43 or the interference light source 44. This is because the edge-type backlight source 43 and the interference light source 44 are stacked on each other. The edge-type backlight sources 43 and the interference light sources may be stacked in a one-to-one manner. Each edge-type backlight source 43 and a corresponding interference light source 44 form a pair (in a practical use, the two can share a position at which one backlight source is disposed), and in a top view, only one light source can be viewed and the other is blocked by the one light source. For easy understanding, referring to FIG. 4B and FIG. 4C together, in each pair, the interference light source 44 is disposed above the corresponding edge-type backlight source 43. In practical use, the position of the two light sources can be switched.

When adopting the second manner, the visible light from the edge-type backlight sources 43 and the interference light (invisible for human eyes, for example, infrared light) from the interference light sources 44 enter from the left side surface of the light guide plate 42 at the same time, then is reflected and scattered by the bottom side surface (functioning as a grid point surface of the light guide plate 42) of the light guide plate 42, and exits from the top surface (functioning as light exiting surface of the light guide plate 42) of the light guide plate 42.

In practical use, the interference light sources 44 and the edge-type backlight sources 43 can share one printed circuit board (PCB). For each pair, the interference light source may be disposed together with the edge-type backlight source 43 at a PCB positioning point. Alternatively, for each pair, the interference light source 44 may be packaged together with the edge-type backlight source 43 in a chip for simplifying the configuration of the light bar and reducing the manufacturing cost.

When adopting the first and the second manners, there is no need to match the meshes of the interference light source and the light guide plate, and only the meshes of the visible light sources (edge-type backlight sources) and the light guide plate need to be matched. The light uniformity of the light from the interference light sources may be degraded after passing through the light guide plate, therefore it is able to further interfere and interrupt the image display and further prevent the surreptitious photographing.

Third Manner: each backlight source is an edge-type backlight source, the display apparatus may further include a first light bar for disposing the edge-type backlight sources and a second light bar disposed along a side surface of the light guide plate. The second light bar is opposed to the first light bar or is adjacent to the first light bar. The interference light sources are disposed on the second light bar, and the second light bar has a straight-line shape or an L-shape.

The third manner is also referred to as a multiple-sided edge-type or a cornered/sided edge-type. That is, while the first light bar is disposed on one side of the light guide plate, the second light bar may be disposed on an adjacent side, or an opposed side, or all the other three sides, or a corner portion, of the light guide plate. When adopting this multiple-sided edge-type or a cornered/sided edge-type, there is no need to match with meshes of the light guide plate. The light uniformity of the light from the interference light sources may be further degraded after passing through the light guide plate, therefore it is able to further interfere and interrupt the image display and further prevent the surreptitious photographing.

There is no limit to the quantities of the edge-type backlight sources and the interference light sources, and there is no limit to the interval manners between the edge-type backlight sources and the interference light sources. For example, the edge-type backlight source and the interference light source may be disposed alternately. For another example, for every two edge-type backlight sources, one interference light source may be disposed between the two edge-type backlight sources at a middle point. For yet another example, for every three or more edge-type backlight sources, one interference light source may be disposed.

Figure 5:
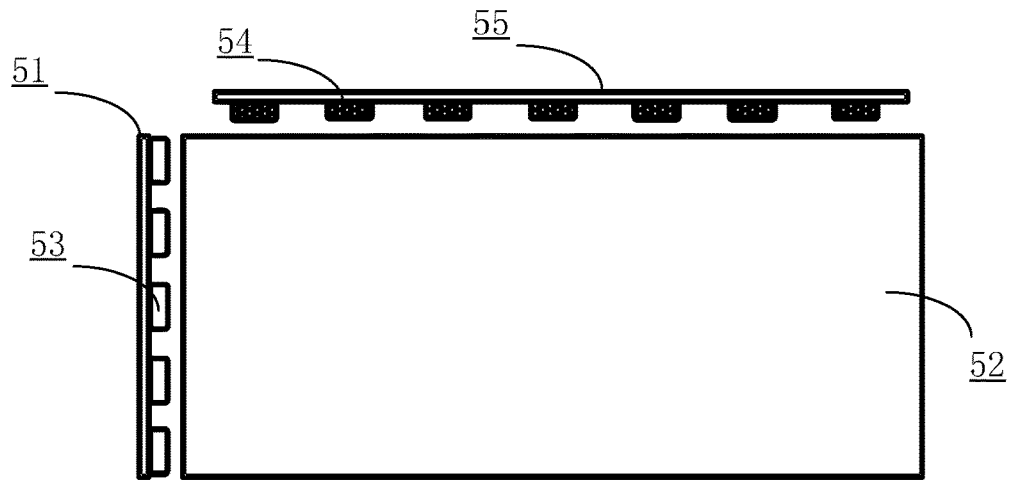
FIG. 5 is a diagram showing an arrangement of an interference light sources and edge-type backlight sources in a liquid crystal display panel using a third manner according to an embodiment of the present disclosure.

For easy understanding, referring to FIG. 5 which is a diagram showing an arrangement of interference light sources and edge-type backlight sources in a liquid crystal display panel using a third manner according to an embodiment of the present disclosure, the first light bar 51 is disposed on left side surface (functioning as a light incident surface of the light guide plate 52) of the light guide plate 52. The edge-type backlight sources 53 (for example, LED can be employed as the edge-type backlight sources for illuminating visible light) are disposed on the first light bar 51. The interference light sources 54 are disposed on the second light bar 55. The invisible light from the edge-type backlight sources 53 and the interference light (invisible light invisible for human eyes) from the interference light sources 54 enters at the same time from the left side surface and the upper side surface of the light guide plate 52, then is reflected and scattered by the bottom surface (functioning as a grid point surface of the light guide plate 52) of the light guide plate 52, and exits from the top surface (functioning as a light exiting surface of the light guide plate 52) of the light guide plate 52.

In FIG. 5, the second light bar 55 is disposed on the upper side surface of the light guide plate 52 which is adjacent to the first light bar 51. The second light bar 55 has a similar shape with the first light bar 51, that is, has a rod shape (straight-line shape). The second light bar 52 may have a length equal to or shorter than a length of the upper side surface of the light guide plate 52. The second light bar 55 may have an L-shape. In order to simply installation and better match with the light guide plate, the L-shape is preferable to have a right angle.

Figure 6:
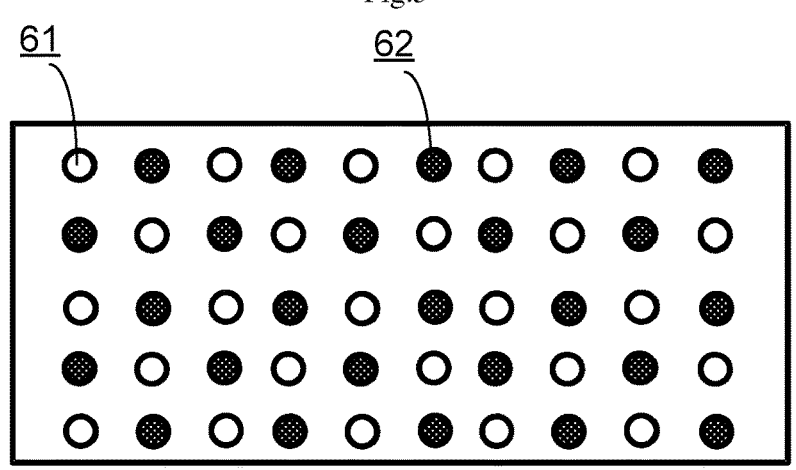
FIG. 6 is a diagram showing an arrangement of an interference light sources and edge-type backlight sources in a liquid crystal display panel using a fourth manner according to an embodiment of the present disclosure.

Fourth Manner: each backlight source is a direct-type backlight source, and in the display apparatus, the interference light sources and the direct-type backlight sources may be disposed alternately and spaced from one another. For easy understanding, FIG. 6 which is a diagram showing an arrangement of an interference light source and a edge-type backlight source in a liquid crystal display panel using a fourth manner according to an embodiment of the present disclosure, may be referred.

The quantities of the direct-type backlight sources and the interference light sources and interval manners between the direct-type backlight sources and the interference light sources are not limited. For example, the direct-type backlight sources and the interference light sources may be disposed alternately. For another example, for every predetermined number of direct-type backlight sources, one interference light source may be disposed.

For the liquid crystal display panel, the arrangement manner of the interference light sources and the backlight sources are not limited to the above-described three arrangement manners. In practical design, the interference light sources may be disposed at different portions of the liquid crystal display panel of the display apparatus. For example, the interference light sources may be disposed on a frame of the display apparatus. In this configuration, the interference light from the interference light sources has no need to pass through the light guide plate. Thus, there is no need to reflection or scattering the light before generating the interference light on the display area of the display panel. In this configuration, the interference light is directly generated on the display side of the display panel. This configuration is simple, and has no need to perform a new design on the backlight source module of the liquid crystal display panel.

Figure 7:
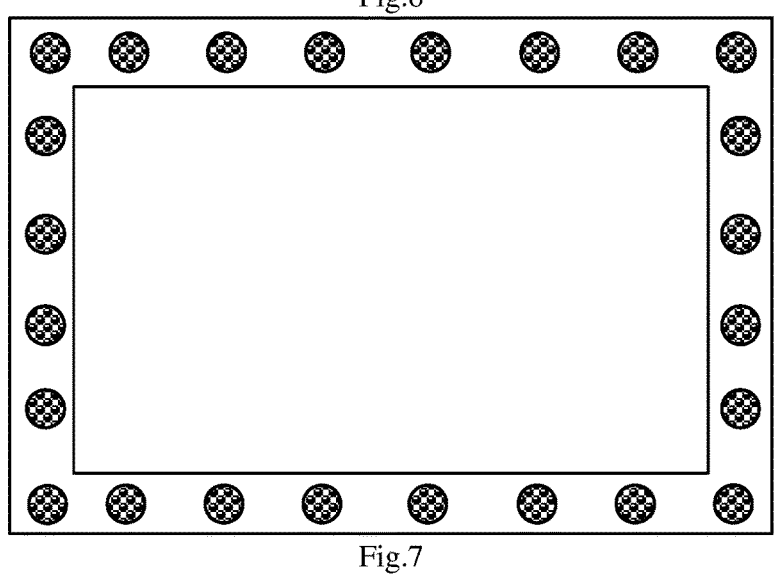
FIG. 7 is a diagram showing an arrangement in which only interference light sources are disposed around an OLED panel or an electrophoresis display panel according to an embodiment of the present disclosure.

(2) When the display panel is an OLED panel or an electrophoresis display panel, the interference light sources are disposed around the OLED panel or the electrophoresis display panel. FIG. 7 may be referred, which is a diagram showing an arrangement, in which only interference light sources are disposed around an OLED panel or an electrophoresis display panel according to an embodiment of the present disclosure.

Since the OLED panel is a self-illuminating device, the OLED panel can illuminate visible light to perform the display operation. In this case, the interference light source only needs to be disposed around the OLED panel. The interference light illuminated from the interference light source is invisible light (for example, infrared light). Thus, the interference light can generate interference to a photographing device and causes a photographing failure of surreptitious photographing. The electrophoresis display panel performs the display operation with use of the environment light. For example, when a user uses the electronic paper during day time or under a lighting environment, the electronic paper can normally display the information on the display screen (for example, an electronic book reader without backlighting function). Under this circumstance, the interference light source may also be disposed around the electrophoresis display panel.

In practical design, there is no limit to how to arrange the interference light sources around the two types of the display panels. For example, multiple interference light sources may be evenly disposed on a frame of a display apparatus which adopts one of the above-described two type display panels. The interference light sources may also be disposed on only one side, only two sides, or only three sides of the frame. For example, multiple interference light sources may be disposed on each of two opposing sides of the frame. For another example, only one interference light source may be disposed on one side of the frame as long as that the interference light from this interference light source has enough intensity to make interference on the displayed content, so that the surreptitious photographing can be prevented and interference effect can be achieved.

Figure 9:
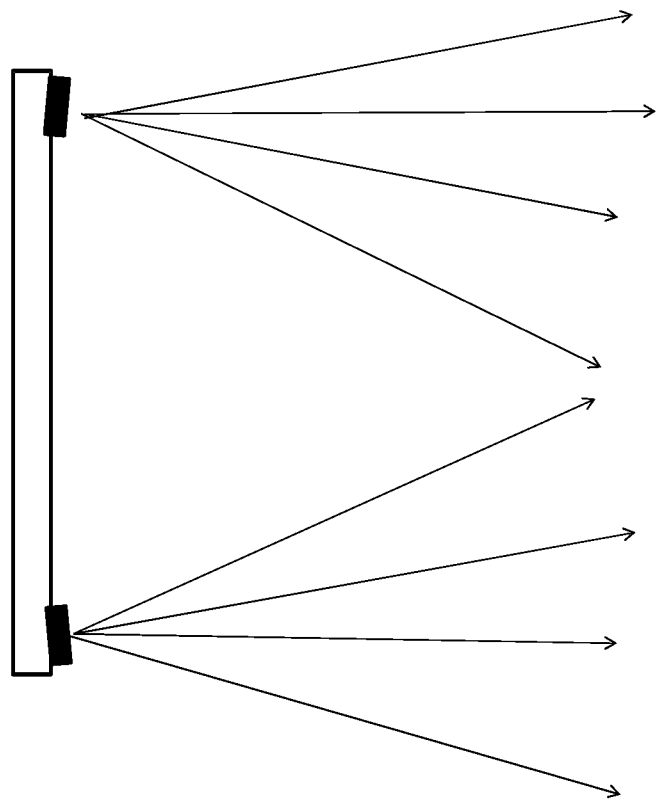
FIG. 9 is a diagram showing an arrangement in which interference light sources are disposed inclined toward an OLED panel or an electrophoresis display panel according to an embodiment of the present disclosure.

Alternatively, in an embodiment of the present disclosure, the interference light source may be inclined toward a center of the OLED panel or a center of the electrophoresis display panel at a predetermined angle, referring to FIG. 9, which is a diagram showing an arrangement in which an interference light source is disposed inclined toward an OLED panel or an electrophoresis display panel according to an embodiment of the present disclosure. In this configuration, the angle is set so that the interference light from the interference light sources can cover entire display area of the OLED panel or entire display area of the electrophoresis display panel. In this configuration, the direction of the interference light sources is set to generate interference on the display area of the display panel to prevent the surreptitious photographing at a maximum level.

In an embodiment of the present disclosure, the interference light sources may employ infrared light illuminating diode in any one of the above-described arrangement manner of the interference light sources. Since the infrared light from the infrared light illuminating diode is invisible for human eyes, the user may not be affected when viewing the information displayed on the display panel. Further, infrared light is detectable by almost types of existing photographing devices, thus, the infrared light inevitably generates substantial interference to the photographing devices, and the photographed image is substantially different from the displayed image on the display panel so that the surreptitious photographing ends with failure.

For the electrophoresis display panel, such as the electronic paper, when a user uses the display panel in the night time or no-lighting environment, the electronic paper may fail to perform the display operation. With consideration of this difficulty, a visible light source may be provided to the electrophoresis display panel so that the user can view the displayed content properly. For easy understanding, referring to FIG. 8 which is a diagram showing an arrangement in which both visible light sources and interference light sources are disposed around an electrophoresis display panel according to an embodiment of the present disclosure, the visible light sources and the interference light sources are alternately disposed around the electrophoresis display panel. With this configuration, even there is no environment light, the user can view the displayed content properly.

An embodiment of the present disclosure further provides a backlight device for providing backlight to the liquid crystal display panel. The backlight device includes the interference light sources which generate the interference light on the display side of the liquid crystal display panel. Herein, the interference light is invisible light. The modification of the backlight device is the newly added interference light source. The interference light sources are required to be able to generate the interference light to interfere the displayed content on the liquid crystal display panel so that surreptitious photographing of the liquid crystal display panel is prevented.

The above-described display apparatus and the backlight sources are proposed for a display panel that illuminates light in an active manner or in a passive manner with use of the environment light. In practical use, a light source module may be provided to an object that cannot illuminate light, such as exhibited paintings, calligraphies, and murals. That is because taking photos of these special objects is usually forbidden. In view of this, the present disclosure also provides in some embodiment a light source module which includes an interference light source disposed around the target to be interfered. The target to be interfered is a display device. The interference light source can generate the interference light on a surface of the target to be interfered. Herein, the interference light is invisible light.

Alternatively, the light source module may further include a frame surrounding a target to be interfered. In this case, the interference light sources are disposed on the frame.

Figure 8:
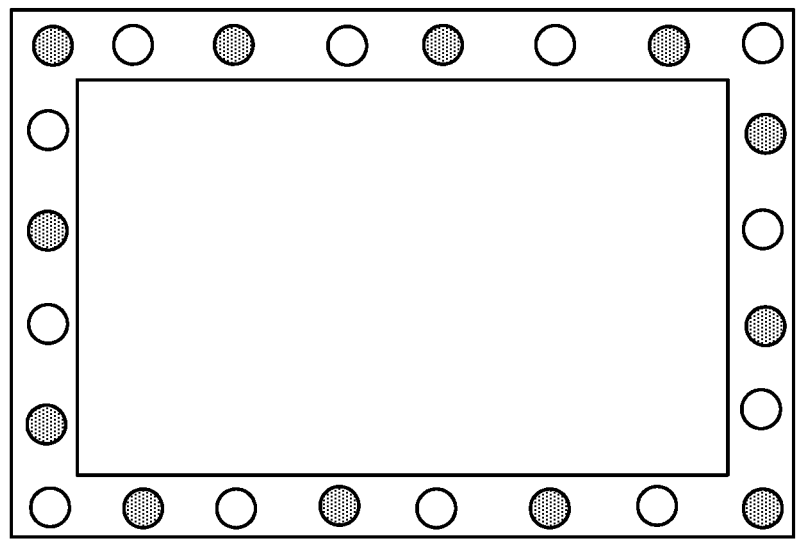
FIG. 8 is a diagram showing an arrangement in which both visible light sources and interference light sources are disposed around an electrophoresis display panel according to an embodiment of the present disclosure.

In this case, the interference light source may be disposed around the target to be interfered. Thus, the disposing of the interference light sources may refer to the arrangement manners when the OLED panel or the electrophoresis display panel is used (FIG. 7 to FIG. 9). Hence, the detailed description of the arrangement manners is omitted.

With the embodiments of the present disclosure, the interference light which is invisible for human eyes can be illuminated toward the display panel or other objects. Since the interference light is detectable by the photographing device, the content displayed on the display panel cannot be normally displayed on the photographing view, so as to cause the photographed image includes noises. With this configuration, surreptitious photographing by a stranger can be prevented while securing the user to view the display panel properly. Thus, the safety of the user privacy can be secured.

The above are merely the preferred embodiments of the present disclosure. Obviously, a person skilled in the art may make further modifications and improvements without departing from the principle of the present disclosure, and these modifications and improvements shall also fall within the scope of the present disclosure.

What is claimed is:
1. A display apparatus comprising:
   a display panel;
   a plurality of interference light sources for generating interference light on a display side of the display panel, the interference light being invisible light;
   a light guide plate; and
   a plurality of backlight sources for providing visible light necessary for a display operation;
   wherein each backlight source is an edge-type backlight source, and the display apparatus further comprises:
   a first light bar for disposing the edge-type backlight sources;
   wherein the plurality of interference light sources and the plurality of backlight sources are disposed on the first light bar along a direction of a long side of a plane of the first light bar, the plane being opposed to the light guide plate; and wherein every two adjacent interference light sources of the plurality of interference light sources are spaced by at least two backlight sources of the plurality of backlight sources.

2. The display apparatus according to claim 1, wherein the display panel is a liquid crystal display panel.

3. The display apparatus according to claim 2, wherein both the interference light sources and the backlight sources are disposed on one side of a light incident surface of the light guide plate, the invisible light from the interference light sources passes through the light guide plate and reaches the liquid crystal display panel, and the invisible light sources generate the interference light on the display side of the liquid crystal display panel.

4. The display apparatus according to claim 3, wherein each interference light source is an infrared luminescent apparatus.

5. The display apparatus according to claim 2, wherein each interference light source is an infrared luminescent apparatus.

6. The display apparatus according to claim 1, wherein each interference light source is an infrared luminescent apparatus.

7. A backlight device for providing backlight for a liquid crystal display panel, wherein the backlight device is applied to the display apparatus according to claim 1, and the backlight device comprises:

interference light sources for generating interference light on a display side of the liquid crystal display panel, the interference light being invisible light.

8. A light source module, applied to the display apparatus according to claim 1 and comprising:

interference light sources disposed around a target to be interfered, the target to be interfered being a display device, wherein the interference light sources are capable of generating interference light on a surface of the target to be interfered and the interference light is invisible light.

9. The display apparatus according to claim 1, wherein every two adjacent interference light sources of the plurality of interference light sources are spaced by three backlight sources of plurality of backlight sources.

10. The display apparatus according to claim 1, wherein every two adjacent interference light sources of the plurality of interference light sources are spaced by four backlight sources of plurality of backlight sources.

* * * * *